United States Patent
Cheron et al.

(10) Patent No.: US 11,988,280 B2
(45) Date of Patent: May 21, 2024

(54) BLOCKING MECHANISM

(71) Applicant: VALEO EMBRAYAGES, Amiens (FR)

(72) Inventors: Antonin Cheron, Cergy Pontoise (FR); Fabien Diascorn, Cergy Pontoise (FR); Christophe Mollier, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/049,743

(22) Filed: Oct. 26, 2022

(65) Prior Publication Data
US 2023/0139357 A1    May 4, 2023

(30) Foreign Application Priority Data
Nov. 4, 2021    (FR) .................................... 21 11747

(51) Int. Cl.
*F16H 63/34* (2006.01)
*F16H 57/02* (2012.01)

(52) U.S. Cl.
CPC .................. *F16H 63/3416* (2013.01); *F16H 2057/02026* (2013.01)

(58) Field of Classification Search
CPC ............. F16H 63/3416; F16H 63/3425; F16H 57/023; F16H 2057/02026
See application file for complete search history.

(56) References Cited

U.S. PATENT DOCUMENTS

| 2011/0290615 | A1* | 12/2011 | Schwekutsch | F16H 63/3491 |
| | | | | 192/219.5 |
| 2019/0271394 | A1* | 9/2019 | Kramer | F16D 63/006 |
| 2020/0200270 | A1 | 6/2020 | Lenke et al. | |
| 2023/0279946 | A1* | 9/2023 | Atsumi | F16H 63/3416 |
| | | | | 192/219.5 |

FOREIGN PATENT DOCUMENTS

| DE | 10 2018 131 099 A1 | 6/2019 |
| DE | 102019109381 A1 * | 10/2019 |
| EP | 3 670 973 A1 | 6/2020 |
| WO | WO 2019/001642 A1 | 1/2019 |

OTHER PUBLICATIONS

French Preliminary Search Report dated Jun. 1, 2022 in French Application 21 11747, filed on Nov. 4, 2021 (with English Translation of Categories ofcited documents and Written Opinion), citing 1 & 15-17 documents therein, 10 pages.

* cited by examiner

*Primary Examiner* — Lori Wu
(74) *Attorney, Agent, or Firm* — Oblon, McClelland, Maier & Neustadt, L.L.P.

(57) ABSTRACT

A blocking mechanism including a transmission casing and a movable pawl having a locking finger. The movable pawl is pivotably mounted in a plane about a pivot axis on the transmission casing between a locking position in which the locking finger is engaged in the locking recess and a release position in which the locking finger is disengaged from the locking recess. The movable pawl includes a cam surface. A linear actuator moves a movable carriage guided by a guide rail, in which the movable carriage includes a cam follower capable of moving on the cam surface, and a housing formed in the transmission casing, in which the guide rail is fitted in the housing.

19 Claims, 6 Drawing Sheets

BLOCKING MECHANISM

TECHNICAL FIELD

The present invention relates to a blocking mechanism for rotationally blocking a shaft of a drivetrain of a mobility apparatus, such as motor vehicle for example.

TECHNOLOGICAL BACKGROUND

Blocking mechanisms are used, for example, as a parking brake for securing a stationary motor vehicle. In such a case, they make it possible to rotationally block a transmission shaft of the motor vehicle. Such blocking mechanisms are in particular used in motor vehicles with automatic transmission, in hybrid vehicles or electric vehicles.

When the blocking mechanism is activated, its components may be subject to significant loads. Thus, the components of the blocking mechanism must be able to withstand considerable force to ensure reliable blocking.

Blocking mechanisms are known which comprise a pawl having a locking finger and pivotably mounted on a transmission casing between a release position and a locking position in which the locking finger is inserted in a locking recess secured to, in order to rotate as one with, the transmission shaft to be blocked. The blocking mechanism further includes an actuator that moves a movable carriage which is guided in rotation on the transmission casing by means of a guide rail. The movable carriage includes a roller which interacts with a cam surface of the pawl in such a way that a translational movement of the movable carriage causes the pawl to pivot. The guide rail is a piece of stamped sheet metal. It includes, on the one hand, an attachment surface which is attached by means of attachment members, such as screws, to a surface of the transmission casing and, on the other hand, a guide surface against which the roller of the movable carriage rolls and which is substantially perpendicular to the attachment surface. However, given the manufacturing tolerances of the guide rail, the angle formed between the attachment surface and the guide surface is likely to vary around 90°. Furthermore, such a guide rail has a tendency to become deformed under the various mechanical stresses. However, it is important to ensure precise positioning of the guide surface of the guide rail relative to the pawl so as, on the one hand, to ensure reliable blocking and, on the other hand, to prevent excessively high loads from passing through the blocking mechanism and thus damaging the latter.

It is thus necessary to propose a blocking mechanism which is reliable, inexpensive, easy to implement and withstands high loads.

SUMMARY

One idea forming the basis of the invention is a blocking mechanism for rotationally blocking a shaft of a vehicle.

One idea forming the basis of the invention is a blocking mechanism which makes it possible to solve one or more technical problems encountered in the prior art, for example the abovementioned problems.

The invention relates to a blocking mechanism for rotationally blocking a shaft of a vehicle having at least one locking recess, the blocking mechanism comprising:
- a transmission casing;
- a movable pawl comprising a locking finger, the movable pawl being pivotably mounted in a plane about a pivot axis on the transmission casing between a locking position in which the locking finger is engaged in the locking recess and a release position in which the locking finger is disengaged from said locking recess, the movable pawl comprising a cam surface,
- a linear actuator which moves a movable carriage guided by a guide rail,
- in which the movable carriage includes a cam follower capable of moving on the cam surface so as to move the movable pawl from the release position into the locking position,
- a housing formed in the transmission casing,
- in which the guide rail is fitted in the housing so as to prevent movement of the guide rail in the plane.

By virtue of these features, the guide rail is kept in the housing while being prevented from deforming when the blocking mechanism goes from a release position into a locking position or vice versa. To be specific, the housing takes up the loads exerted by the movable carriage on the guide rail. Thus, precise relative positioning of the guide rail is ensured.

According to one embodiment, the housing is machined in dimensions selected in such a way as to secure the guide rail and prevent movement of said guide rail in any direction in the plane.

The term "machined housing" should be interpreted within the meaning of the invention as meaning removal of material from the transmission casing.

According to one embodiment, the housing has a first side wall facing and at a distance from a second side wall and a first longitudinal wall located between the first side wall and the second side wall,
in which the guide rail has, corresponding to the housing, a first side wall facing and at a distance from a second side wall and a first longitudinal wall located between the first side wall and the second side wall,
and in which the first side wall, the second side wall and the first longitudinal wall of the guide rail are in contact with the first side wall, the second side wall and the first longitudinal wall, respectively, of the housing.

According to one embodiment, the housing has a second longitudinal wall facing and at a distance from the first longitudinal wall, and in which the guide rail has a second longitudinal wall facing and at a distance from the first longitudinal wall.

According to one embodiment, the guide rail includes only the first side wall, the second side wall, the first longitudinal wall.

According to one embodiment, the guide rail includes only the first side wall, the second side wall, the first longitudinal wall and the second longitudinal wall. In other words, the guide rail does not include a bottom wall or a ceiling.

According to one embodiment, all of the walls of the guide rail are perpendicular to the plane.

According to one embodiment, the first side wall, the second side wall, the first longitudinal wall and/or second longitudinal wall of the guide rail has a thickness of between 1.5 mm and 3.5 mm; preferably between 2.5 and 3 mm.

According to one embodiment, the housing has an opening and the guide rail has an opening, the opening in the housing and the opening in the guide rail being through openings.

According to one embodiment, the opening in the housing is made in at least one wall selected from: the first side wall, the second side wall, the first longitudinal wall and second longitudinal wall of the housing, preferably in the second longitudinal wall.

According to one embodiment, the opening in the guide rail is made in at least one wall selected from: the first side wall, the second side wall, the first longitudinal wall and second longitudinal wall of the guide rail, preferably in the second longitudinal wall.

According to one embodiment, the opening in the housing and the opening in the guide rail are facing one another.

According to one embodiment, the housing has a notch and the guide rail has a notch, the notch in the housing and the notch in the guide rail are through notches and are intended to allow the passage of the linear actuator.

According to one embodiment, the notch is selected from: a recess, a cut-out, an oblong hole, a groove or a slot.

According to one embodiment, the notch in the housing is located on the first side wall of the housing and the notch in the guide rail is located on the first side wall of the guide rail.

According to one embodiment, the housing has a height of between 15 mm and 30 mm.

According to one embodiment, the cam follower includes a movable roller capable of moving on the cam surface at the opening in the housing and at the opening in the guide rail.

By virtue of these features, when the movable carriage is moving relative to the guide rail, the friction forces between the movable carriage and the guide rail are reduced. Therefore, movement of the movable carriage is ensured without wear of the movable carriage or of the guide rail.

According to one embodiment, the movable carriage comprises a second movable roller capable of moving along the first longitudinal wall of the guide rail.

According to one embodiment, the guide rail comprises a non-return stop preventing the movable carriage from moving beyond said guide rail.

By virtue of these features, the movable carriage is kept in the housing.

According to one embodiment, the non-return stop is formed by the first side wall of the guide rail.

According to one embodiment, an attachment means attaches the guide rail to the transmission casing, the attachment means attaching the guide rail in a direction perpendicular to the plane.

According to one embodiment, the attachment means is selected from: a screw, a screw/nut system or an adhesive material.

According to one embodiment, the guide rail is made as a single piece from a bent metal strip.

The invention also relates to a transmission system comprising a shaft having at least one locking recess and a blocking mechanism as defined above.

According to one embodiment, the shaft comprises a wheel including the at least one locking recess. For example, the wheel is a ratchet wheel.

According to one embodiment, the wheel includes one to twelve locking recesses.

According to one embodiment, the plurality of recesses are spaced apart regularly from one another.

The invention also relates to a motor vehicle comprising a transmission system as described above.

DESCRIPTION OF THE EMBODIMENTS

The mechanism for rotationally blocking a shaft of a vehicle comprises in particular: a movable pawl, a linear actuator, a movable carriage, a guide rail and a housing. The blocking mechanism is in particular intended for immobilizing a vehicle, for example a car, when it is parked.

The various elements of the guide mechanism according to various alternative embodiments are presented below.

Figure 1:
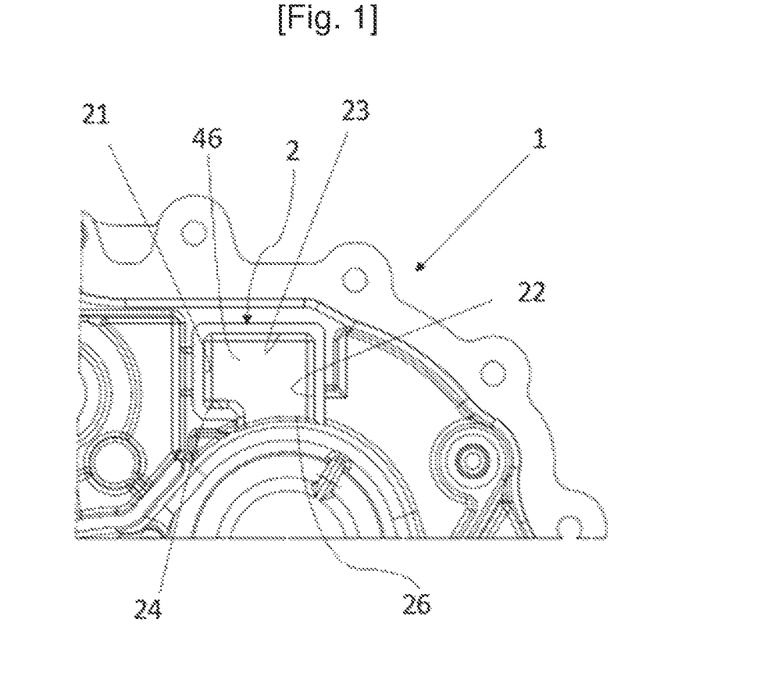
FIG. 1 is an end-on view of a portion of a transmission casing comprising a housing for the guide rail according to one embodiment
Figure 2:
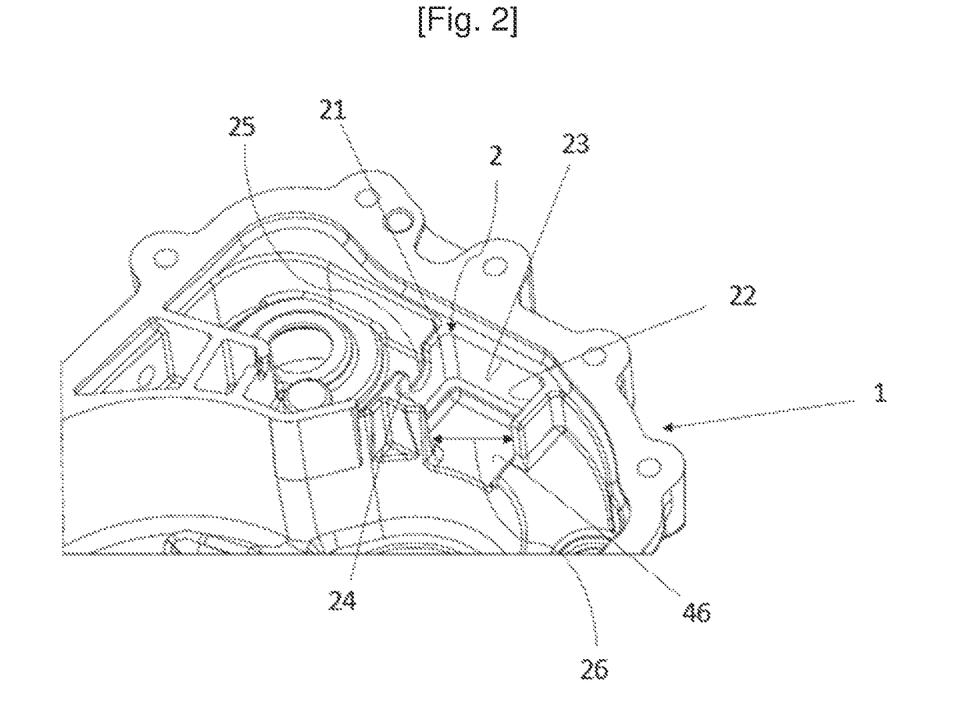
FIG. 2 is a perspective view of FIG. 1.

FIGS. 1 and 2 show a transmission casing 1 comprising a housing 2 for the vehicle blocking mechanism.

The housing 2 is formed in the transmission casing 1, in other words the housing is not a separate part which is attached to the transmission casing 1. To be specific, the housing 2 is hollowed out or made directly in the thickness of a wall of the transmission casing 1.

The housing 2 has a generally rectangular shape with rounded corners and comprises a first side wall 21 facing and at a distance from a second side wall 22, a first longitudinal wall 23 facing and at a distance from a second longitudinal wall 24, and a bottom wall 46.

Figure 3:
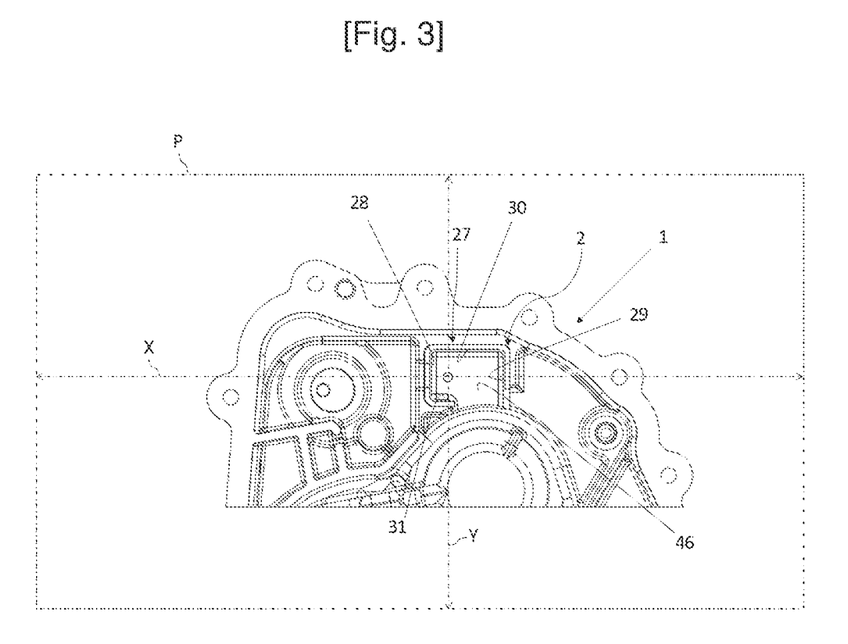
FIG. 3 is an end-on view of a portion of a transmission casing comprising a housing and a guide rail according to one embodiment.
Figure 4:
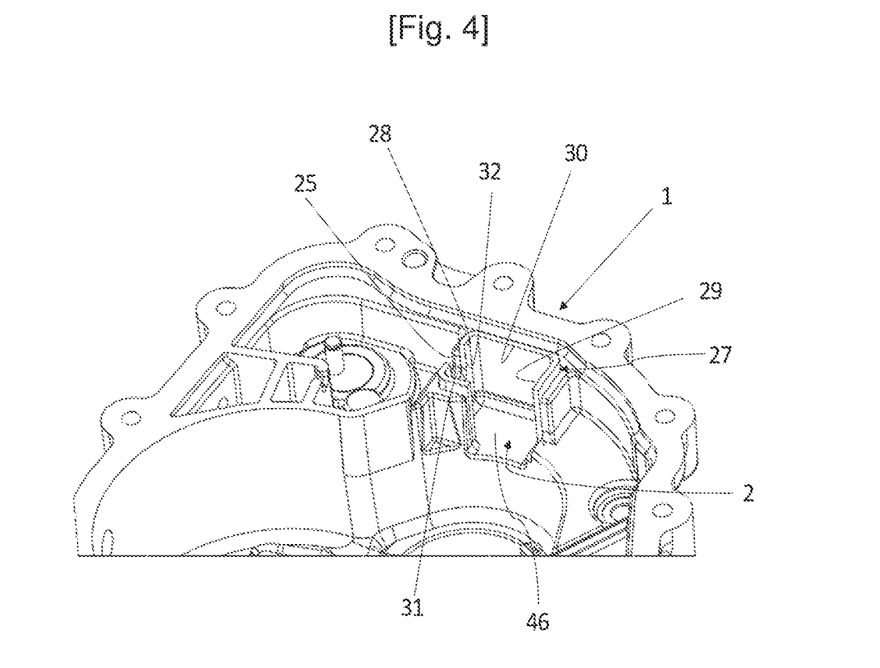
FIG. 4 is a perspective view of FIG. 3.
Figure 5:
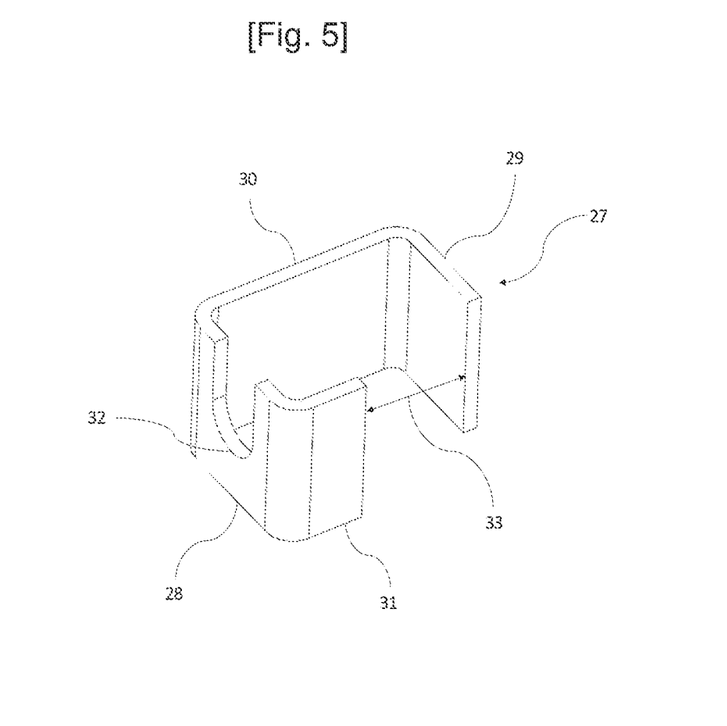
FIG. 5 is a perspective view of the guide rail shown in FIGS. 3 and 4.

The housing 2 is intended to house and secure a guide rail, shown in particular in FIGS. 3, 4 and 5.

FIGS. 3 and 4 show a portion of a transmission casing 1 comprising the housing 2 as depicted in FIGS. 1 and 2 and also show a guide rail 27 housed in the housing 2.

The guide rail 27 has dimensions similar to the housing 2 so as to be fixedly fitted in the housing 2, in other words the guide rail 27 follows the contour of the housing 2. The guide rail is thus held in a static position inside the housing 2 in a plane P comprising a longitudinal direction X and a transverse direction Y transverse to the longitudinal direction X, and in an orthogonal direction O at right angles to the plane, towards the bottom wall 46. This arrangement is particularly advantageous since the various pressures exerted on the guide rail 27 are taken up by the walls of the housing 2 and thus by the transmission casing 1. This arrangement makes it possible to retain the dimensions of the guide rail 27, without deformation and hence without deterioration over time. Such a guide rail is in particular shown in FIG. 5.

Like the housing 2 as shown in FIGS. 1 and 2, the guide rail 27 shown in FIG. 5 has a first side wall 28 facing and at a distance from a second side wall 29 and a first longitudinal wall 30 facing and at a distance from a second longitudinal wall 31.

The first 28 and second 29 side walls and said first 30 and second 31 longitudinal walls of the guide rail 27 are in contact with the first 21 and second 22 side walls and the first 23 and second 24 longitudinal walls, respectively, of the housing 2.

Figure 6:
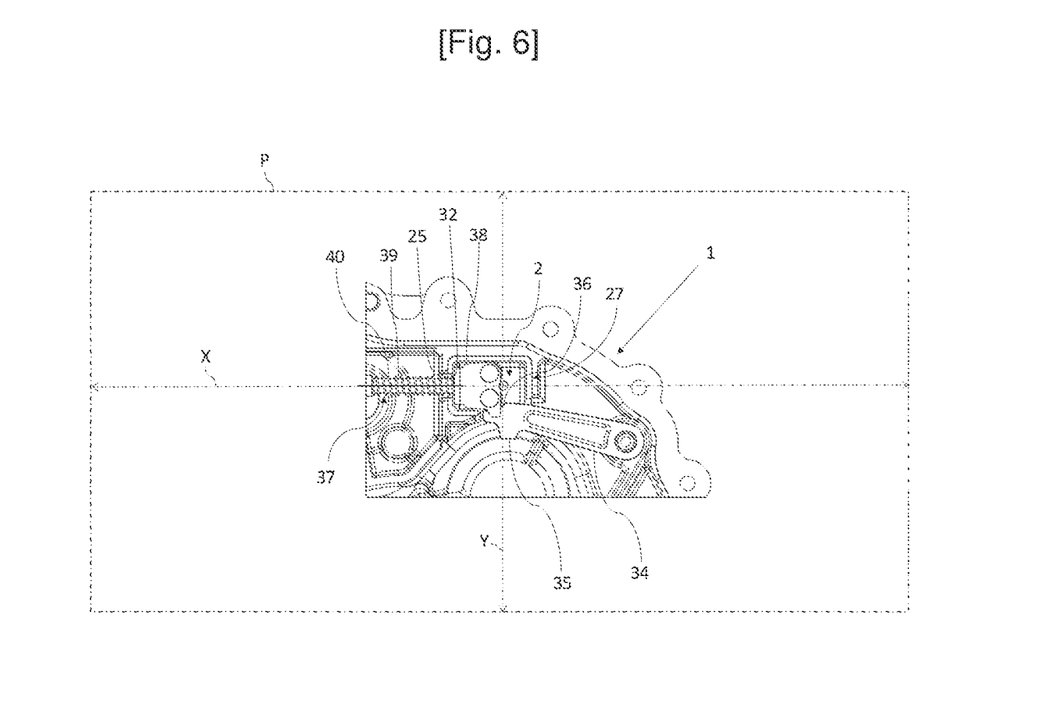
FIG. 6 is an end-on view of a portion of a transmission casing comprising the blocking mechanism according to one embodiment.
Figure 7:
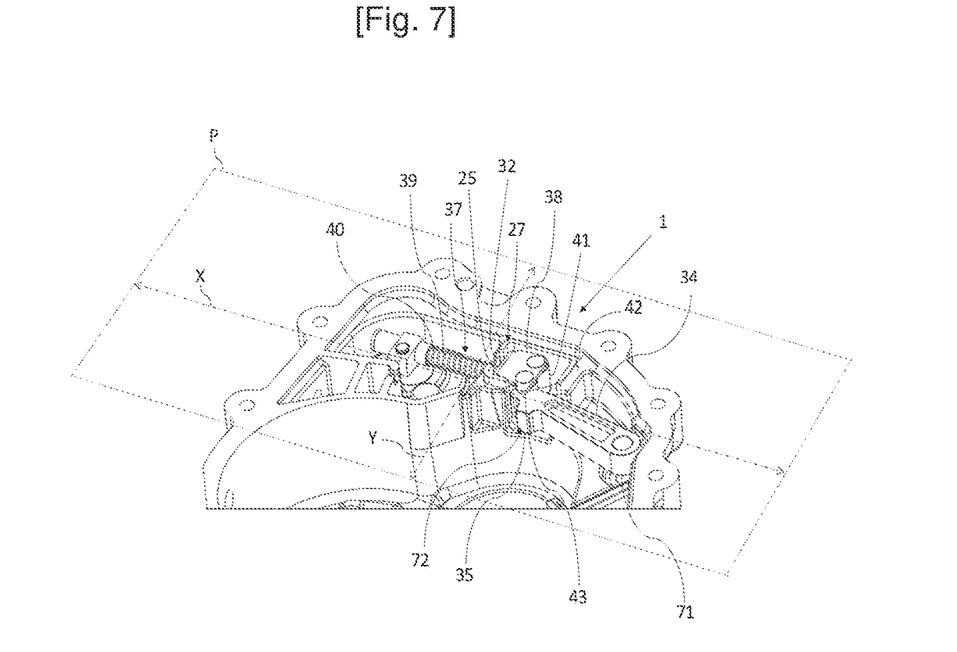
FIG. 7 is a perspective view of FIG. 6.

Furthermore, the first side wall 21 of the housing 2 comprises a notch 25 intended to allow the passage of a linear actuator which is shown in FIGS. 6 and 7. The notch 25 has a "U" shape.

The first side wall 28 of the guide rail 27 comprises a notch 32 with a shape corresponding to the shape of the notch 25 in the housing 2, as shown in FIG. 4. The notch 32 is intended to allow the passage of a linear actuator which is depicted in FIGS. 6 and 7.

Figure 11:
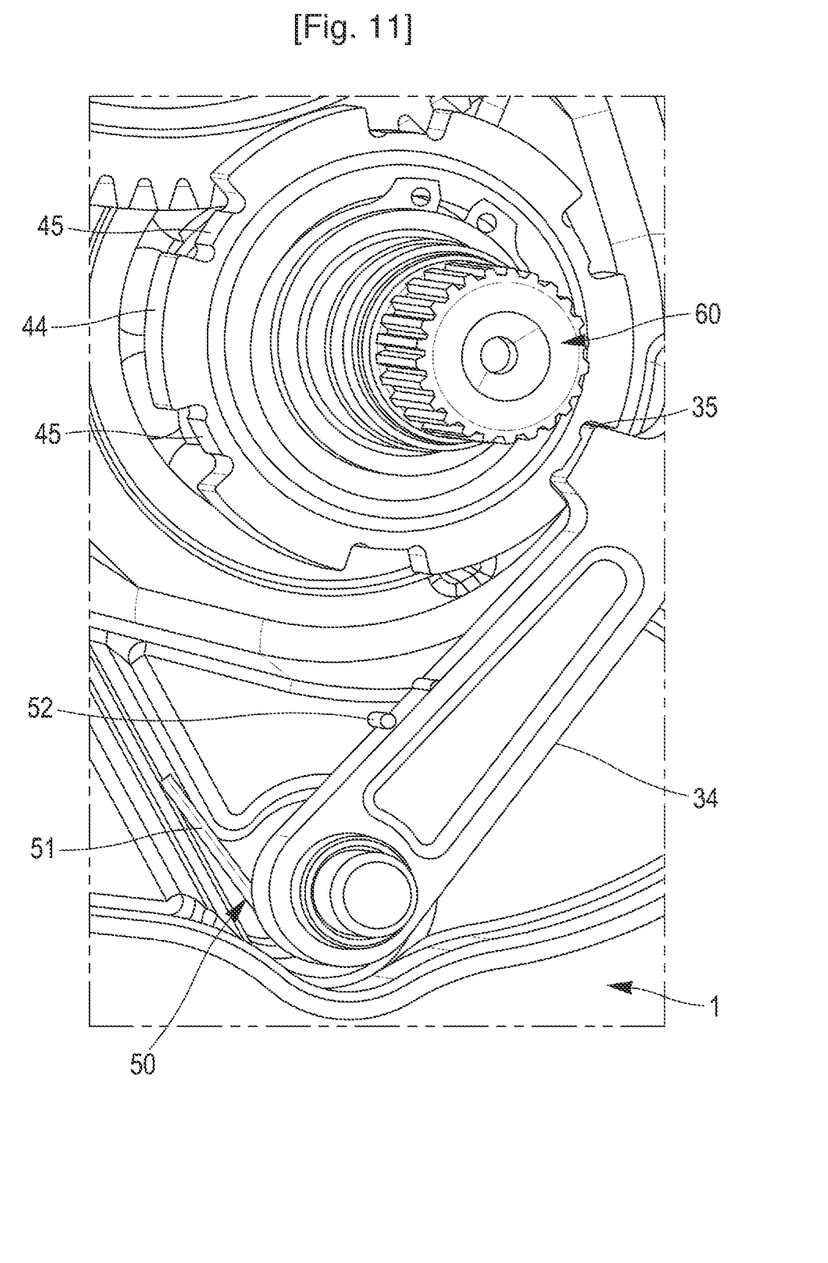
FIG. 11 is a perspective view of a rotationally blocked shaft of a vehicle.

The second side wall 22 and the second longitudinal wall 24 of the housing 2 have a shared opening 26 allowing contact between a movable carriage located in the housing 2, shown in FIGS. 6 and 7, and a movable pawl located at the opening 26, shown in FIGS. 6, 7 and 11.

The second longitudinal wall 31 and the second side wall 29 of the guide rail 27 have a shared opening 33 in communication with the opening 26 in the housing 2.

The first side wall 28 of the guide rail 27 is a non-return stop for the movable carriage 38, shown FIGS. 6 and 7, so that the movable carriage is retained in translation in the housing 2, by the guide rail 27.

The guide rail 27 serves to guide the movable carriage and ensure that it only performs the translational movement necessary to actuate a locking finger in a locking recess so that the blocking mechanism is in a locking position. The locking position allows a motor vehicle to be parked, for example.

The guide rail is made for example from a metal strip which is on the one hand cut so as to form the notch then bent three times along its length so as to form said walls of which it is composed. The metal strip has a rectangular shape before being bent. The metal strip, before bending, may also comprise a notch intended to form the notch in the guide rail.

FIGS. 6 and 7 show a partial view of a mechanism for rotationally blocking a shaft in a release position.

The blocking mechanism comprises the housing 2 as described in FIGS. 1 to 4 and the guide rail 27 as described in FIGS. 3 to 5. The blocking mechanism further comprises a movable pawl 34 located in the transmission casing 1.

The movable pawl 34 has an elongate shape and has a first end 71 and a second end 72 at a distance from the first end 71.

The first end 71 makes it possible to attach the movable pawl 34 to the transmission casing 1 while allowing rotational movement of said movable pawl 34. In other words, the movable pawl is pivotably mounted in a plane P about a pivot axis.

The second end 72 is located at the opening 33 in the guide rail 27 and at the opening 26 in the housing. The second end 72 comprises a cam surface 36 located on a first lateral face of the movable pawl 34, towards the inside of the housing 2. The second end 72 further comprises a locking finger 35 projecting towards the outside of the housing 2 from a second lateral face of the movable pawl 34. The locking finger 35 is intended, when the blocking mechanism is triggered, to be inserted in a locking recess, shown in FIG. 11. The locking recess is for example located on a ratchet wheel 44 which is capable of receiving said locking finger 35, as shown in FIG. 11, and which is secured to, in order to rotate as one with, the transmission shaft 60 to be rotationally blocked.

According to an alternative shown in FIG. 11, the movable pawl 34 further comprises a torsion spring 50. The torsion spring 50 is wound at the first end 71 of the movable pawl 34. The torsion spring 50 comprises a first end portion 51 which bears against a bearing surface of the transmission casing and a second end portion 52 which bears against a bearing surface of the movable pawl 34. The torsion spring 50 is arranged so as to exert a return force on the movable pawl 34 so as to return same to the release position. The blocking mechanism further comprises a linear actuator 37, shown partially in FIG. 6, which is attached to the transmission casing 1. The linear actuator 37 comprises a rod 39 capable of moving in the longitudinal direction X.

The rod 39 extends through the notch 25 in the housing 2 and the notch 32 in the guide rail 27 as far as an internal space in the housing 2. The rod 39 is attached to the movable carriage 38 located in the housing 2.

The movable carriage 38 is intended to be guided by the guide rail 27.

In the case where the movable carriage 38 is pushed back by the movable pawl 34 in a dynamic phase the movable carriage 38 comes into abutment against the first side wall 28 of the guide rail 27, which thus forms a non-return stop for the movable carriage 38. The movable carriage 38 is in this case pushed against the movable pawl 34 by a return force exerted by a traction spring 40 which surrounds the rod 39 and which includes a first end attached to the body of the actuator and a second end attached to the movable carriage 38. This effect may be produced, for example, during an attempt at engagement at excessively high speed. Beyond a threshold speed, for example between 3 km/h and 5 km/h, the movable pawl 34 springs back so as to prevent engagement, the movable carriage 38 is thus pushed into abutment.

The movable carriage 38 further comprises a first movable roller 41 capable of moving along the first longitudinal wall 30 of the guide rail 27. The movable carriage 38 further comprises a cam follower 42 including a second movable roller which is in contact with the cam surface 36 of the movable pawl 34 and capable of moving along this cam surface 36.

The movable carriage 38 further comprises a lug 43 located at the second end of the movable pawl 34. The lug 43 is intended to keep the movable pawl 34 in the plane P.

To move the movable pawl 34 into the locking position, the rod 39 of the linear actuator 37 is moved through the notch 32 in the guide rail 27 thus moving the movable carriage 38 in a longitudinal direction. The movable carriage 38 is moved from the first side wall 28 of the guide rail 27, towards the second side wall 29. The movement of the movable carriage 38 causes the first movable roller 41 to move along the first longitudinal wall 30 of the guide rail 27 and the cam follower 42 to move along the cam surface 36 of the movable pawl 34. The cam surface 36 has a slope and the movable carriage 38 thus exerts, via its movement, pressure towards the cam surface 36 of the movable pawl 34. This pressure causes a rotational movement of the second end of the movable pawl 34 towards a locking recess in such a way that the locking finger 35 becomes engaged in a locking recess present for example on a ratchet wheel as shown in FIG. 11 so as to lock said ratchet wheel 44.

FIG. 11 shows a transmission casing 1 comprising a ratchet wheel 44. The ratchet wheel 44 has a plurality of recesses 45 spaced apart regularly from one another, all the way around the ratchet wheel 44. Each recess 45 of the plurality of recesses has dimensions making it possible to receive the locking finger 35 of the movable pawl 34. FIG. 11 also shows a shaft 60 of a vehicle which is rotationally blocked by the blocking mechanism.

To move the blocking mechanism from the locking position into the release position, the rod 39 is moved in such a way as to move the movable carriage 38 towards the first side wall 28 until it comes into abutment against the first side wall 28 of the guide rail 27. The locking finger 35 is disengaged from the locking recess present on the ratchet wheel 44, which releases this ratchet wheel and thus allows rotation of the transmission shaft 60.

Figure 8:
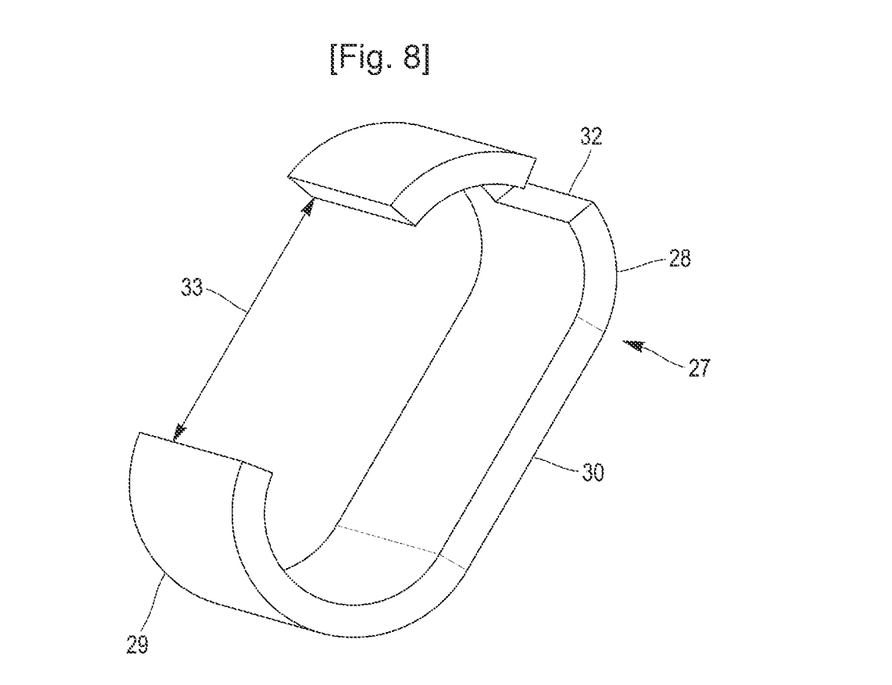
FIG. 8 is a perspective view of a guide rail according to another embodiment.
Figure 9:
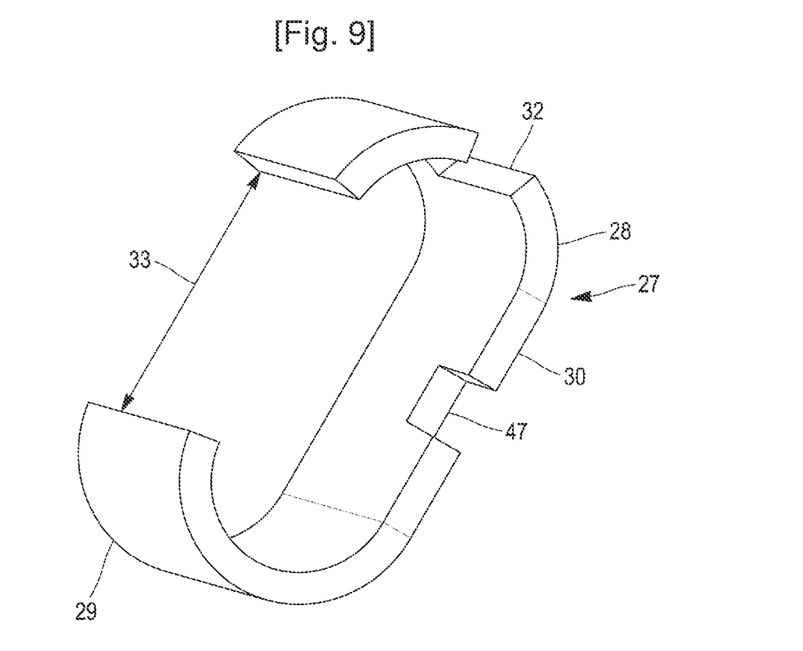
FIG. 9 is a perspective view of a guide rail according to another embodiment.
Figure 10:
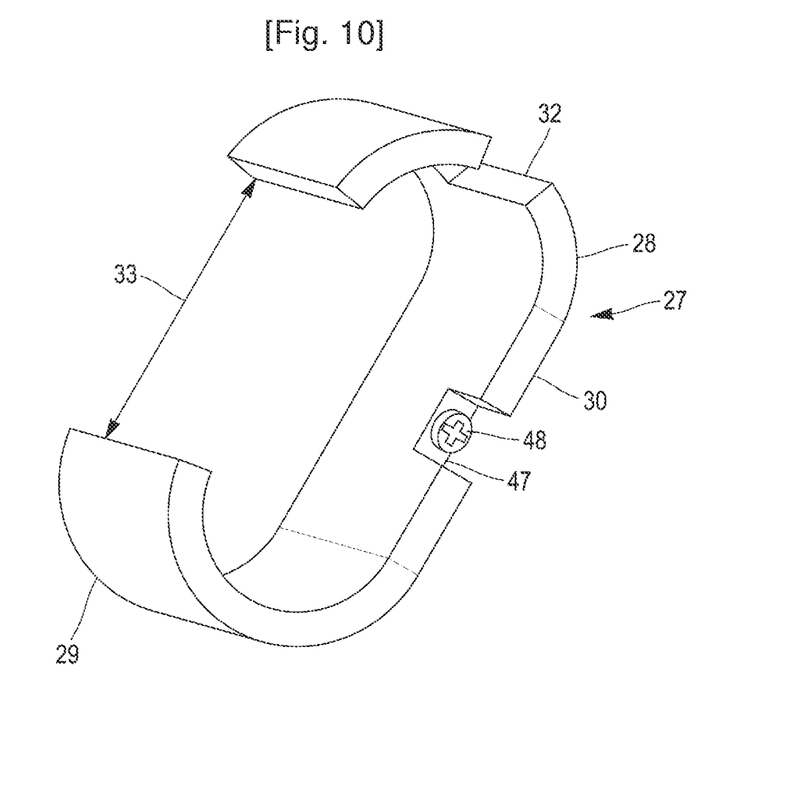
FIG. 10 is a perspective view of a guide rail comprising an attachment means according to one embodiment.

FIGS. 8 to 10 show guide rails 27 according to several embodiments, intended to be fitted in housings of the transmission casing.

FIG. 8 shows a guide rail 27 intended to be fitted in a housing formed in the transmission casing. The guide rail 27 has dimensions similar to the housing in such a way as to be retained in the housing 2 by cooperation of shapes between the walls of the housing and the walls of the guide rail 27. In this regard, the guide rail 27 has a first side wall 28 facing and at a distance from a second side wall 29 and a first longitudinal wall 30 located between the first side wall 28 and the second side wall 29. The first side wall 28 and the second side wall 29 are curved. The first side wall 28 of the guide rail 27 comprises a notch 32.

FIGS. 9 and 10 show a guide rail further comprising a groove 47 located on the edge of the first longitudinal wall 30.

The groove 47 receives an attachment means 48, for example a screw, intended to attach the guide rail 27 in an orthogonal direction O at right angles to the longitudinal direction of the first longitudinal wall 30.

The housing intended to receive the guide rail in FIGS. 8 to 10 has dimensions making it possible to receive the guide rail 27 fitted thereinside. The housing thus has four parts, namely: a bottom wall, a first side wall facing and at a distance from a second side wall and a first longitudinal wall located between the first side wall and the second side wall. The first side wall and the second side wall are respectively curved in a semi-circle complementary to one another, so as to follow the first and second side walls of the guide rail. The first longitudinal wall of the housing faces an opening made by the gap between the first side wall and the second side wall.

Although the invention has been described in association with a plurality of particular embodiments, it is clear that it is in no way limited to this, and that it comprises all technical equivalents of the means described, as well as their combinations, if these come within the scope of the invention.

Use of the verbs "comprise" or "include" and their conjugated forms does not exclude the presence of elements or steps other than those described in a claim.

In the claims, any reference sign between parentheses should not be interpreted as limiting the claim.

The invention claimed is:

1. Blocking mechanism for rotationally blocking a shaft of a vehicle having at least one locking recess, the blocking mechanism comprising:
    a transmission casing;
    a movable pawl comprising a locking finger, the movable pawl being pivotably mounted in a plane about a pivot axis on the transmission casing between a locking position in which the locking finger is engaged in one of the at least one locking recess and a release position in which the locking finger is disengaged from one of said at least one locking recess, the movable pawl comprising a cam surface,
    a linear actuator which moves a movable carriage guided by a guide rail, in which the movable carriage includes a cam follower capable of moving on the cam surface so as to move the movable pawl from the release position into the locking position,
    a housing formed in the transmission casing, in which the guide rail is fitted in the housing so as to prevent movement of the guide rail in the plane,
    wherein the housing has a first side wall facing and at a distance from a second side wall and a first longitudinal wall located between the first side wall and the second side wall, wherein the guide rail has, corresponding to the housing, a first side wall facing and at a distance from a second side wall and a first longitudinal wall located between the first side wall and the second side wall, and
    wherein the first side wall, the second side wall and the first longitudinal wall of the guide rail are in contact, respectively, with the first side wall, the second side wall and the first longitudinal wall of the housing.

2. Blocking mechanism according to claim 1, wherein the housing has a second longitudinal wall facing and at a distance from the first longitudinal wall of the housing, and in which the guide rail has a second longitudinal wall facing and at a distance from the first longitudinal wall of the guide rail.

3. Blocking mechanism according to claim 2, wherein the non-return stop is formed by the first side wall of the guide rail.

4. Blocking mechanism according to claim 2, wherein the housing has an opening and wherein the guide rail has an opening, the opening in the housing and the opening in the guide rail being through openings.

5. Blocking mechanism according to claim 1, wherein the housing has an opening and wherein the guide rail has an opening, the opening in the housing and the opening in the guide rail being through openings.

6. Blocking mechanism according to claim 5, wherein the cam follower includes a movable roller capable of moving on the cam surface at the opening in the housing and at the opening in the guide rail.

7. Blocking mechanism according to claim 1, wherein the housing has a notch and in which the guide rail has a notch, in which the notch in the housing and the notch in the guide rail are through notches and are intended to allow the passage of the linear actuator.

8. Blocking mechanism according to claim 7, wherein the non-return stop is formed by the first side wall of the guide rail.

9. Blocking mechanism according to claim 1, wherein the guide rail comprises a non-return stop preventing the movable carriage from moving beyond said guide rail.

10. Blocking mechanism according to claim 1, wherein an attachment means attaches the guide rail to the transmission casing, the blocking attachment means blocks movement of the guide rail in a direction perpendicular to the plane.

11. Blocking mechanism according to claim 1, wherein the guide rail is made as a single piece from a bent metal strip.

12. Transmission system comprising a shaft having at least one locking recess and a blocking mechanism according to claim 1.

13. Motor vehicle comprising a transmission system according to claim 12.

14. Blocking mechanism according to claim 1, wherein the housing has an opening and wherein the guide rail has an opening, the opening in the housing and the opening in the guide rail being through openings.

15. Blocking mechanism according to claim 1, wherein the housing has a notch and the guide rail has a notch, in which the notch in the housing and the notch in the guide rail are through notches and are intended to allow the passage of the linear actuator.

16. Blocking mechanism according to claim 1, wherein the guide rail comprises a non-return stop preventing the movable carriage from moving beyond said guide rail.

17. Blocking mechanism according to claim 1, wherein an attachment means attaches the guide rail to the transmission casing, the blocking attachment means blocks movement of the guide rail in a direction perpendicular to the plane.

18. Blocking mechanism according to claim 1, wherein the guide rail is made as a single piece from a bent metal strip.

19. Transmission system comprising a shaft having at least one locking recess and a blocking mechanism according to claim 1.

* * * * *